US007143973B2

(12) United States Patent
Ballew

(10) Patent No.: US 7,143,973 B2
(45) Date of Patent: Dec. 5, 2006

(54) AVIA TILTING-ROTOR CONVERTIPLANE

(76) Inventor: Kenneth Sye Ballew, 2976 Norway Pine La., Lantana, FL (US) 33462

( * ) Notice: Subject to any disclaimer, the term of this patent is extended or adjusted under 35 U.S.C. 154(b) by 135 days.

(21) Appl. No.: 10/861,367

(22) Filed: Jun. 7, 2004

(65) Prior Publication Data

US 2005/0127238 A1 Jun. 16, 2005

Related U.S. Application Data

(60) Provisional application No. 60/519,859, filed on Nov. 14, 2003.

(51) Int. Cl.
  *B64C 27/22* (2006.01)
(52) U.S. Cl. .................. 244/6; 244/7 R; 244/12.4; 244/17.27; 244/23 A; 244/56; 244/66
(58) Field of Classification Search ................ 244/6, 244/7 R, 12.4, 17.27, 23 A, 56, 66, 120
  See application file for complete search history.

(56) References Cited

U.S. PATENT DOCUMENTS

| 4,417,708 | A  | * | 11/1983 | Negri ..................... 244/45 R |
| 6,343,768 | B1 | * | 2/2002  | Muldoon ................... 244/7 R |
| 6,382,556 | B1 |   | 5/2002  | Pham ........................... 244/6 |
| 6,561,455 | B1 |   | 5/2003  | Capanna ..................... 244/7 R |
| 6,561,456 | B1 |   | 5/2003  | Devine ........................ 244/12.1 |
| 6,592,073 | B1 | * | 7/2003  | Meekins ..................... 244/105 |
| 6,655,631 | B1 | * | 12/2003 | Austen-Brown ............ 244/12.4 |
| 6,886,777 | B1 | * | 5/2005  | Rock ......................... 244/17.23 |

OTHER PUBLICATIONS

Trek Aerospace Home Page, http://www.millenniumjet.com/index.html, Oct. 4, 2003.

\* cited by examiner

*Primary Examiner*—J. Woodrow Eldred
(74) *Attorney, Agent, or Firm*—Robert P. Bell

(57) ABSTRACT

The present invention provides a tilt rotor aircraft having a centrally mounted tiltable engine and rotor assembly. A turbine or other type of engine (or engines) is pivotally mounted on a central frame above and between the pilot and co-pilot, who occupy separate and identical control cockpit pods on either side of the engine. Placing the engine between the pilot and copilot maintains the CG within a narrow band in both horizontal and vertical flight modes, simplifying control and handling. Counter-rotating propellers may be driven by the engine(s) to eliminate torque effects. By mounting the engine and rotor package between and above the pilot and copilot, the rotor can be made to clear the ground, allowing the aircraft to land like an ordinary fixed-wing aircraft without damaging the propellers. Thus, the craft can be launched and landed in VTOL, HTOL, or STOL configurations, depending upon conditions and available landing and takeoff sites.

24 Claims, 8 Drawing Sheets

AVIA TILTING-ROTOR CONVERTIPLANE

CROSS REFERENCE TO RELATED APPLICATIONS

The present application claims priority from Provisional U.S. Patent Application No. 60/519,859 filed on Nov. 14, 2003, and incorporated herein by reference.

FIELD OF THE INVENTION

The present invention relates to aircraft. In particular, the present invention is directed toward a tilting-rotor aircraft utilizing a centrally located tiltable powerplant fitted with counter-propellers (rotors).

BACKGROUND OF THE INVENTION

Helicopters and other vertical take-off and landing craft (VTOL) are known in the art. The limitations of helicopter designs are also well known. In particular, helicopter rotors generate an enormous amount of aerodynamic drag, which in turn limits the forward speed of a helicopter to much less than that of a conventional fixed-wing aircraft.

Many attempts have been made to overcome this particular deficiency of helicopter design. Probably the most notable attempt has been the limited production of the Bell V-22 Osprey aircraft, which in turn represents the culmination of years of tilt-wing and tilt-rotor research craft. The V-22 Osprey has itself fallen prey to some design limitations. The complex double tilt-rotor mechanism used by the Osprey has failed on occasion resulting in a number of mishaps.

In particular, the V-22 Osprey utilizes two wing-mounted turbine engines, each driving a single large diameter propeller. Each engine drives its corresponding propeller in a direction opposite of the other so as to negate any torque effects. To reduce the likelihood of a crash in the event of a single engine-out situation, the V-22 is also provided with a driveshaft connecting the two engines through a complex gearbox mechanism, such that if one engine fails, the other can drive both propellers. Failure of these complex mechanisms and associated hydraulics hardware has been traced as the cause of some V-22 crashes. A simpler and more robust tilt-rotor design is thus still required in the art.

The V-22 suffers from another design defect as well. Even though the tiltable rotors are mounted on the ends of a high-wing, the craft cannot be landed in horizontal flight mode, except in cases of emergency. If the craft is landed in horizontal flight mode, the blades of the lift/thrust props will strike the ground, destroying the props and possibly causing propeller fragments to injure the crew or bystanders.

Helicopters suffer from yet another design deficiency. In order to provide constant lift throughout the rotation of the main rotor when traveling in a forward direction, a helicopter is generally provided with a swash plate and cyclic control to control the angle of attack of the main rotor through its cycle of rotation. When the rotor is passing in a forward direction in its arc, the angle of attack is reduced. When the rotor is passing in a rearward direction in its arc, the angle of attack is increased. This cyclic control compensates for the difference in lift produced by a helicopter blade when the helicopter is traveling in one direction. However, such swash plate and cyclic controls add complexity to the rotor and hub design, increasing unit cost, maintenance cost and decreasing reliability. In addition, the cyclic control can be difficult to for a pilot to master and requires a different and more complicated skill set which requires extensive pilot training.

Pham, U.S. Pat. No. 6,382,556, issued May 7, 2002, discloses a VTOL airplane with only one tiltable prop-rotor. The Pham design looks like a standard General Aviation (GA) aircraft with a main rotor and tail rotor attached. The tilt mechanism causes the engine and rotor assembly to move from a position aft of the main wing to a position forward of the cockpit. This dramatic tilt moves the Center of Gravity (CG) forward from position 22V to 22H when transitioning from vertical to horizontal flight.

In addition, the amount of space and the weight of the tilting mechanism must be substantial, given the large arc that the engine/rotor assembly travels through. Moreover, as the design is an apparent combination of airplane and helicopter shapes, it presents a fairly long wing and large rotor combination. Such an enormous rotor presents a large amount of drag when in the horizontal flight mode. Pham also suffers from the same deficiency as the V-22 in that it cannot be landed in horizontal flight mode without destroying the main rotor blade, as it will not clear the ground in horizontal flight mode.

Trek Aerospace (www.millenniumjet.com/index.html) discloses a VTOL craft called the SPRINGTAIL(TM) EFV-4. The unit is almost worn by the user in a similar manner to the Bell JetPack of the 1960's. Twin ducted rotors are driven by a rotary engine. A fly-by-wire control system provides directional control to the pilot. It appears that the rotors are tiltable to provide directional thrust. It is not clear how yaw and directional control are obtained. Providing differential thrust could require complex propeller pitch or speed control. The unit does not appear to allow for high-speed horizontal flight.

Thus, what remains a requirement in the art is to produce a VTOL/HTOL/STOL craft having a simple tilt-rotor configuration which can combine the vertical lift-off capabilities of a helicopter with the high speed of a fixed wing aircraft—without increasing complexity and cost over that of a prior art helicopter, and which may take off and land in both vertical and horizontal flight modes.

SUMMARY OF THE INVENTION

The present invention solves the aforementioned problems by providing a tilt rotor aircraft having a centrally mounted tiltable engine and rotor assembly. Being mounted near the center of gravity (CG) of the craft, the engine and rotor assembly can be tilted without disturbing the CG of the aircraft. Moreover, such a central location minimizes the complexity of the engine/rotor mount and tilt mechanism.

A turbine or other type of engine (or engines) is pivotally mounted on a central frame above and between the pilot and co-pilot, who occupy separate and identical control cockpit pods on either side of the engine. Placing the engine between the pilot and copilot maintains the CG within a narrow band in both horizontal and vertical flight modes, simplifying control and handling. As the engine pivots directly on its mount, a simple, lightweight, and robust engine tilt mechanism can be provided.

Counter-rotating propellers (rotors) may be driven by the engine(s) to eliminate torque effects. The use of counter-rotating propellers and a powerful engine allows the craft to use a much smaller rotor diameter than a conventional helicopter, making storage and shipping of the craft much easier. In addition, the smaller diameter rotor means the craft is easier to handle and less likely to encounter blade strikes due to careless handling. Moreover, when traveling in horizontal flight mode, the smaller rotor provides less drag, allowing for higher horizontal speeds.

By mounting the engine and rotor package between and above the pilot and copilot, the rotor can be made to clear the ground, allowing the aircraft to land like an ordinary fixed-wing aircraft without damaging the propellers. Thus, the craft can be launched and landed in VTOL, HTOL, or STOL configurations, depending upon conditions and available landing and takeoff sites.

DETAILED DESCRIPTION OF THE INVENTION

Figure 1:
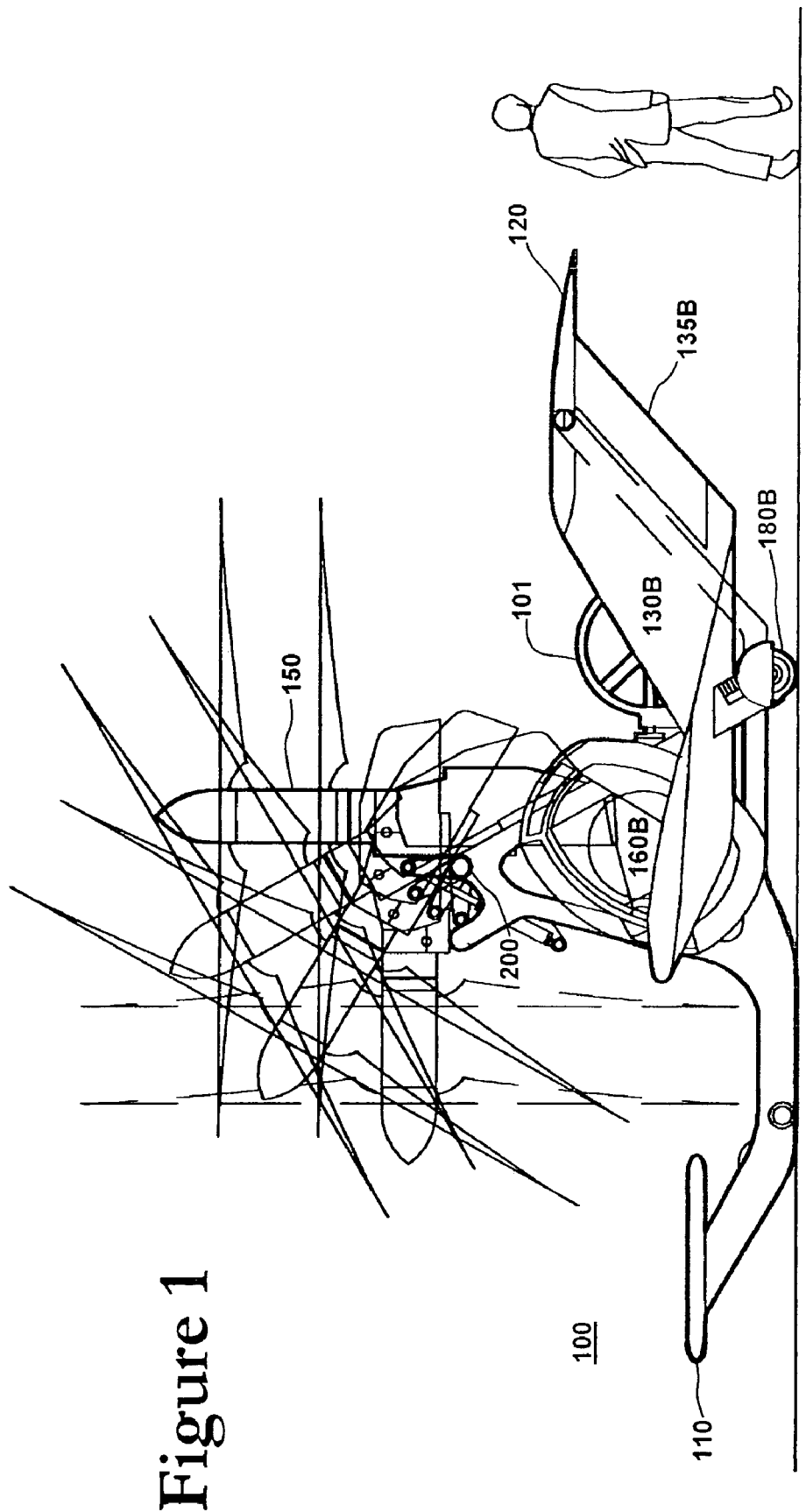
FIG. 1 is a side view of the craft of the present invention illustrating the main components of the craft and illustrating the travel of the tilt engine/rotor from vertical to vertical flight modes.

The following list of design features are generalized for the purpose of describing the present invention to one of ordinary skill in the art. Like reference numerals are used to describe like components.

Figure 2:
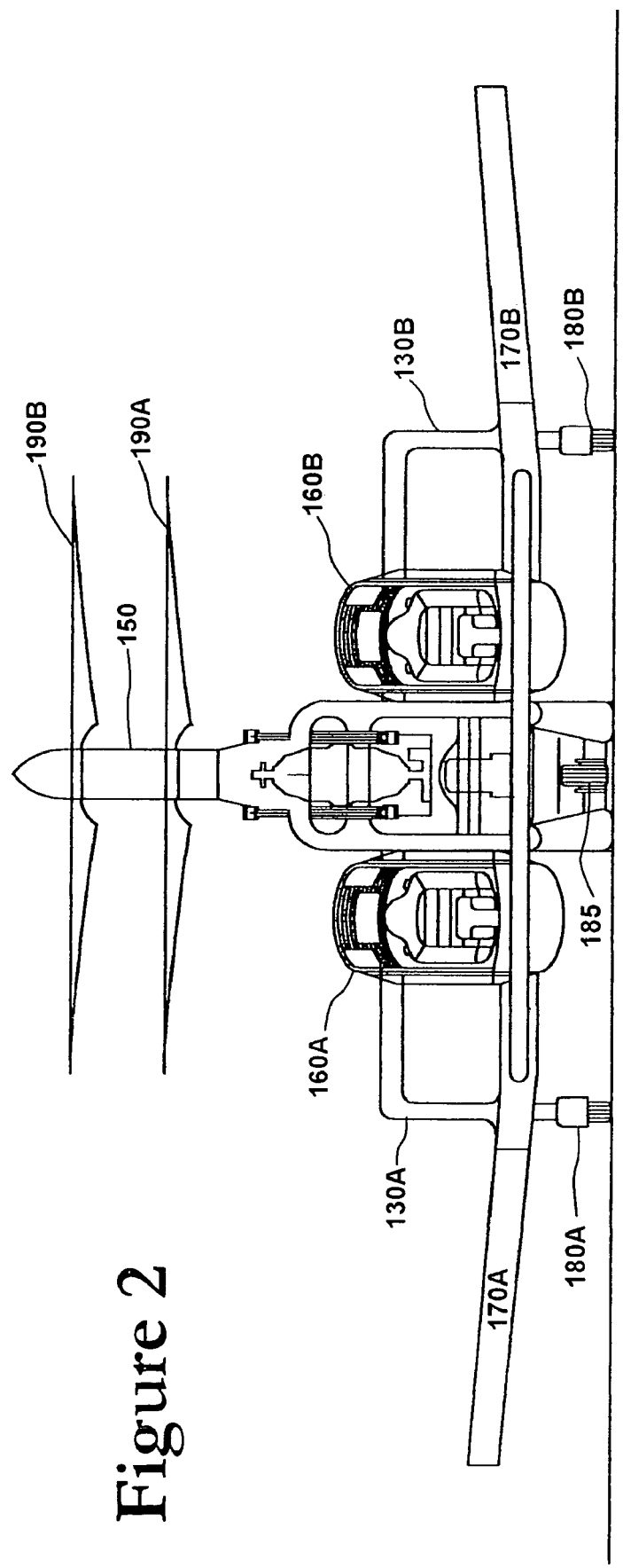
FIG. 2 is a front view of the craft of the present invention illustrating the main components of the craft and illustrating the tilt engine/rotor in the vertical flight mode.
Figure 3:
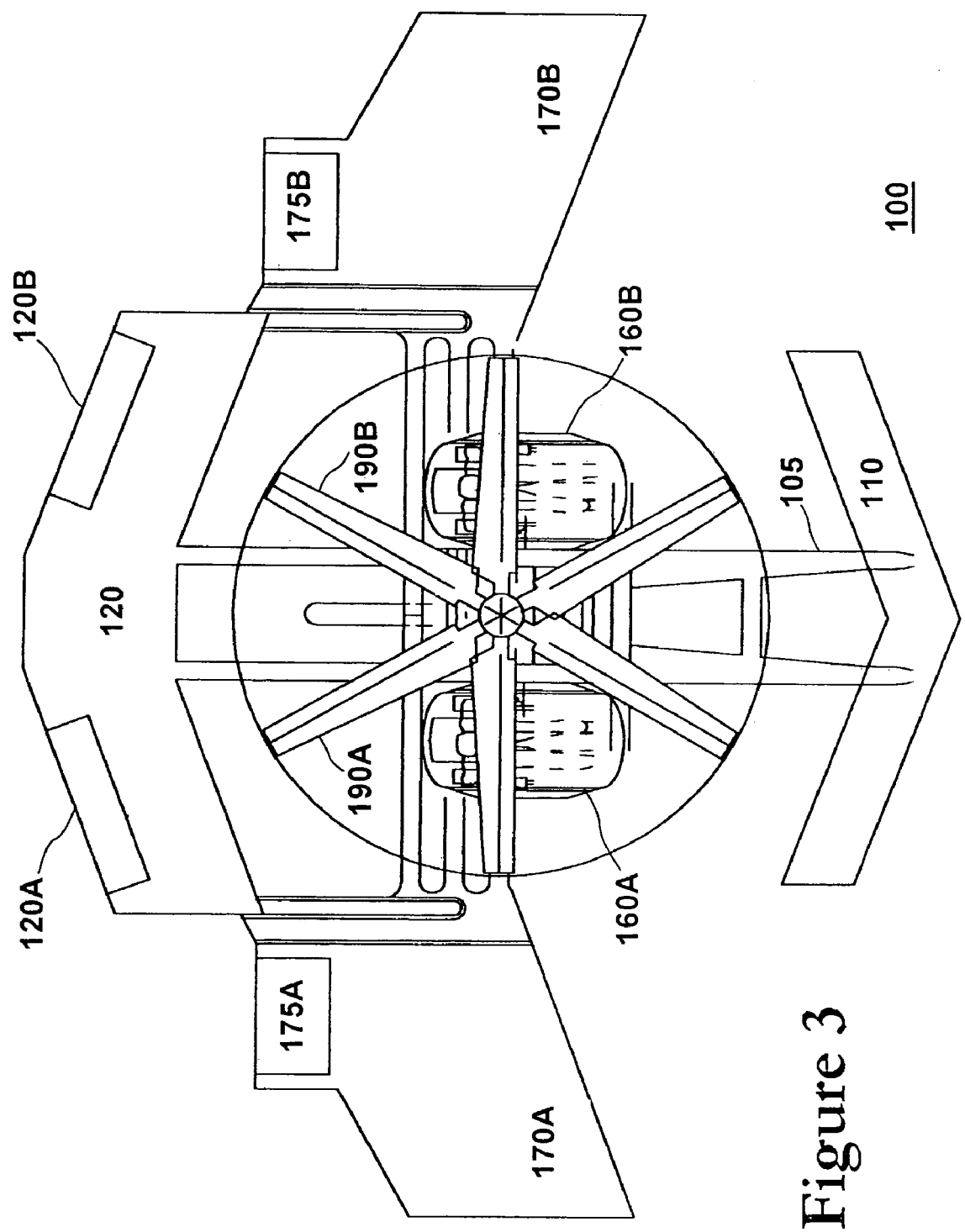
FIG. 3 is a top view of the craft of the present invention illustrating the main components of the craft and illustrating the tilt engine/rotor in the vertical flight mode.
Figure 4:
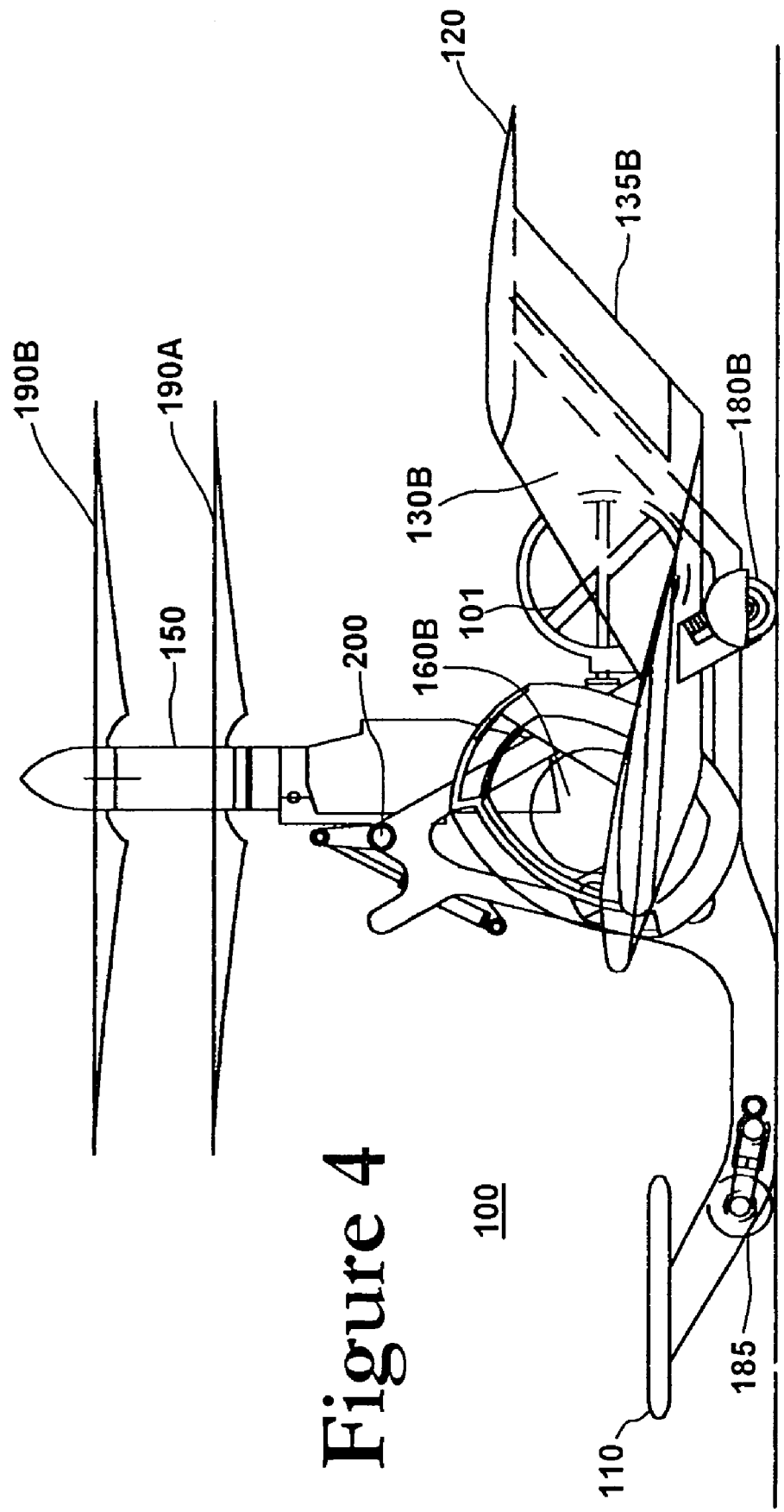
FIG. 4 is a left side view of the craft of the present invention illustrating the main components of the craft and illustrating the tilting engine/rotor in the vertical flight mode.
Figure 5:
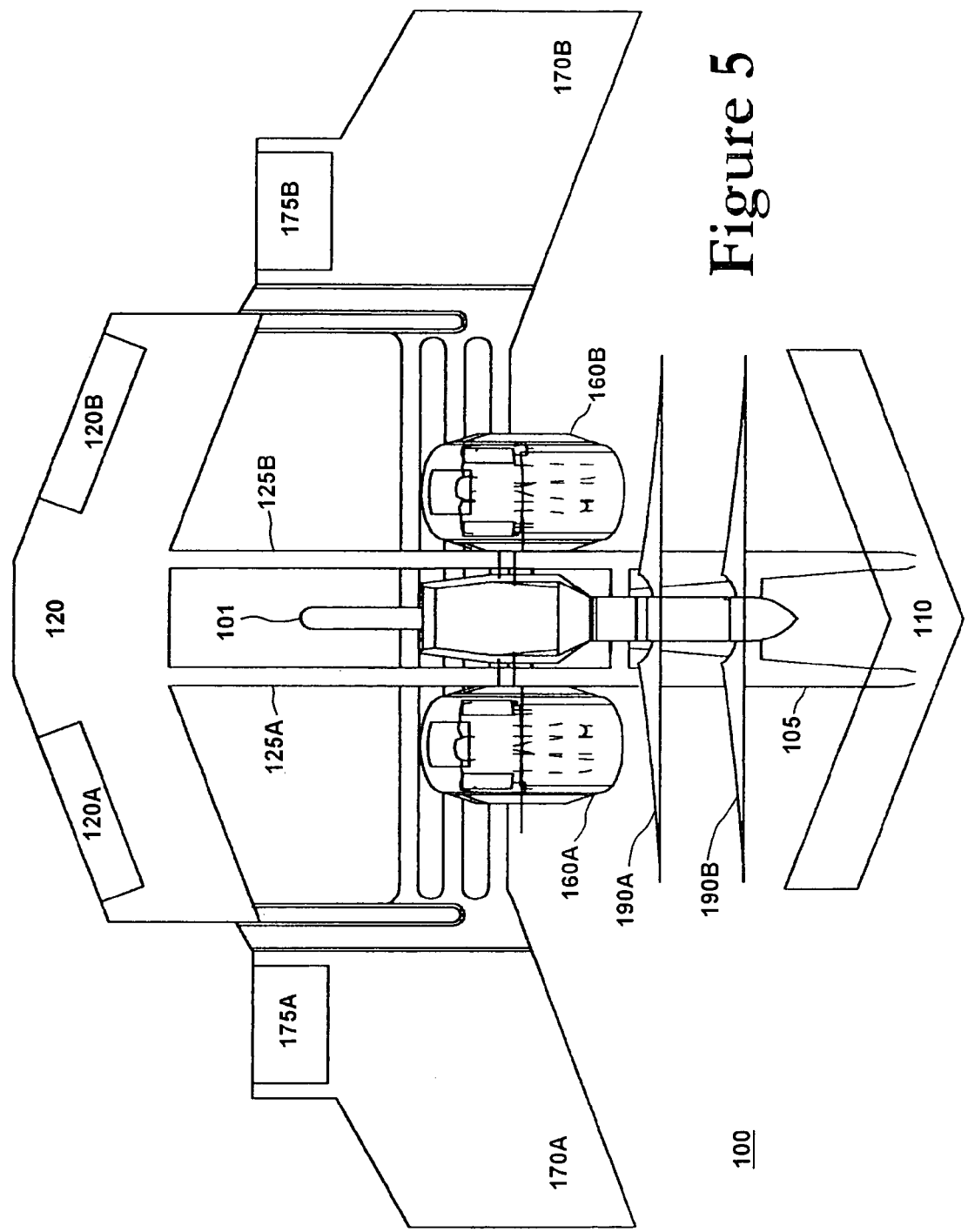
FIG. 5 is another top view of the craft of the present invention illustrating the main components of the craft and illustrating the tilt engine/rotor in the horizontal flight mode.

FIG. 1 is a side view of the craft 100 of the present invention illustrating the main components of the craft 100 and illustrating the travel of the tilt engine/rotor 150 from vertical to horizontal flight modes. FIG. 2 is a front view of the craft 100 of the present invention illustrating the main components of the craft 100 and illustrating the tilting engine/rotor 150 in the vertical flight mode. FIG. 3 is a top view of the craft 100 of the present invention illustrating the main components of the craft 100 and illustrating the tilting engine/rotor 150 in the vertical flight mode. FIG. 4 is a left side view of the craft 100 of the present invention illustrating the main components of the craft 100 and illustrating the tilting engine/rotor 150 in the vertical flight mode. FIG. 5 is another top view of the craft 100 of the present invention illustrating the main components of the craft 100 and illustrating the tilt engine/rotor 150 in the horizontal flight mode.

Referring to FIGS. 1–5, the overall configuration of the craft 100 is arranged in a manner to allow for a high percentage of the down draft of the rigid rotor airflow to move through the structure of the craft 100 thereby building lift through ground effect. The overall configuration of the craft 100 locates the twin vertical stabilizers 130A and 130B and rudders 135A (not shown) and 135B outside of the cylinder of the down draft from the rotors 190A, 190B in the uppermost (vertical flight) position. However, as the craft 100 lifts and rotors 190A, 190B begin to transition to horizontal flight mode, the vertical stabilizers 130A and 130B are progressively more exposed to the airflow, provide yaw control through rudder management.

Three lifting surfaces are included in the overall configuration of the craft 100. Forward of contra-rotating, rigid rotors 190A, 190B is canard 110. Canard 10 may comprise a fixed canard (fixed angle of attack) made from a composite material. A fixed canard may be provided to simplify the control mechanism for the present invention. In an alternative embodiment, a movable canard, or canard provided with movable control surfaces may be provided. At or near the center of gravity 200, two forward swept, removable/foldable wings 170A, 170B provide lift and roll control with electronically controlled ailerons/flaps 175A, 175B. The rear tail plane (horizontal stabilizer) 120 may include elevators and trim tabs 120A, 120B, which may provide pitch control for both the basic configuration and the wingless "sprint" configuration. Elevators 120A, 120B may function as ailerons in sprint configuration, moving in opposite directions to provide roll and bank control.

Figure 8:
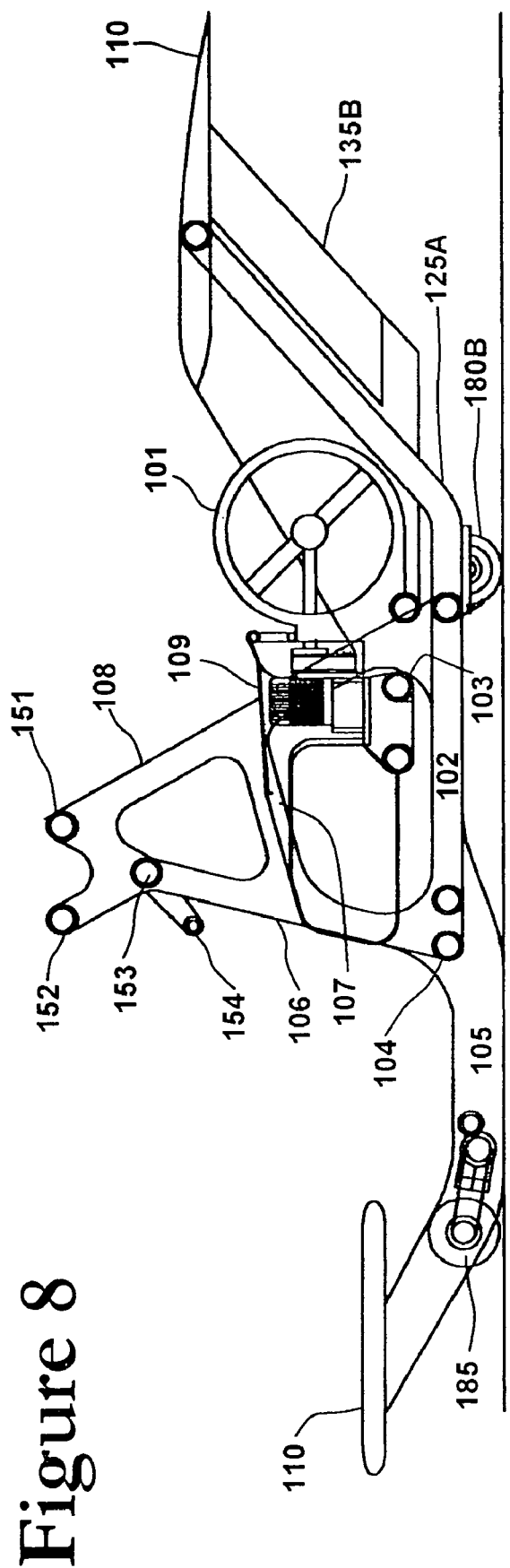
FIG. 8 is a detailed side view of the craft of the present invention with the cockpit pods and engine removed for clarity, illustrating the main components of the craft.

FIG. 8 is a detailed side view of the craft of the present invention with the cockpit pods and engine removed for clarity, illustrating the main components of the craft. Referring to FIGS. 1–5 and 8, the utilization of twin vertical stabilizers 130A and 130B in combination with a rearward located tail rotor 101 and the low torque reaction of the contra-rotating rotors 190A and 190B. provide yaw control without the extended tail boom of a helicopter. This results in a compact footprint for the craft 100 reducing the space requirements for storage and transportation. This condensed arrangement also may allow maneuvers in confined spaces.

The ground area around the large contra-rotating rotors 190A and 190B in the down position is protected by the canard 110, thus preventing ground personnel from walking into the rotors 190A and 190B.

Two occupant (pilot/co-pilot or pilot/passenger) compartments 160A and 160B are located at the sides of the trussed frame 108 supporting the tilting rotor and power plant assembly 150. The advantages of this unusual configuration accrue around specific hazardous operation of the craft 100. The second compartment 160A may be designed in a shape different from the pilot compartment thereby allowing for transport of an immobile person, cargo, or other items.

Figure 6:
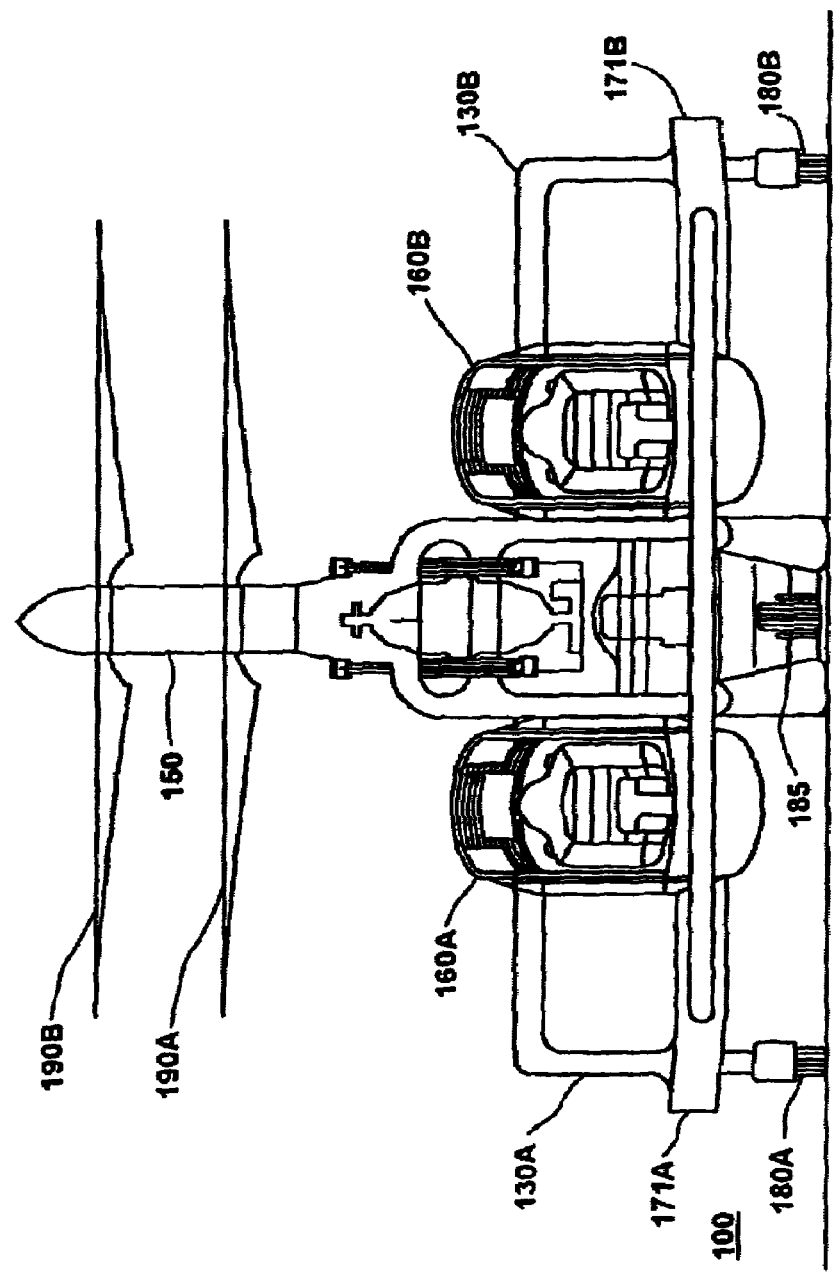
FIG. 6 is a front view of the craft of the present invention in the "sprint" configurations. illustrating the main components of the craft and illustrating the tilt engine/rotor in the vertical flight mode.
Figure 7:
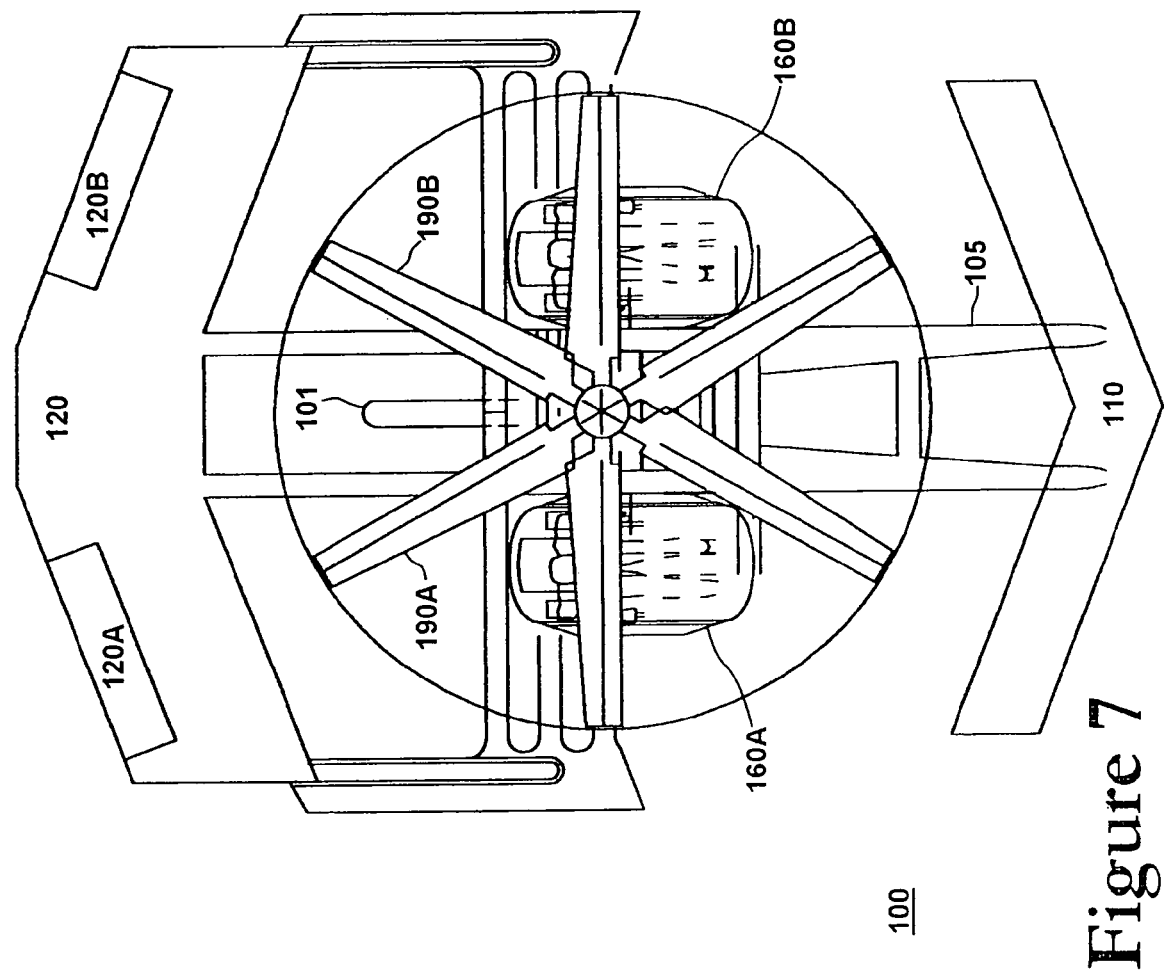
FIG. 7 is a top view of the craft of the present invention in the "sprint" configuration, illustrating the main components of the craft and illustrating the tilt engine/rotor in the vertical flight mode.

FIG. 6 is a front view of the craft of the present invention in the "sprint" configuration, illustrating the main components of the craft and illustrating the tilt engine/rotor in the horizontal flight mode. FIG. 7 is a top view of the craft of the present invention in the "sprint" configuration, illustrating the main components of the craft and illustrating the tilt engine/rotor in the horizontal flight mode. The sprint configuration without the center of gravity 200 wings 170A and 170B represents the minimal weight craft 100 relying on power (thrust) vectoring and the minimum lift/control planes for assent and maneuvering. Absent the required lifting area provided by the wings 170A and 170B, this configuration is seen as a critical event response craft. This lighter craft 100 with sufficient power and the large scale tractor type rotors 190A and 190B can be seen as a VTOL craft 100 with an arc assent through transition from vertical to horizontal flight.

Safety in this configuration relies on the reliability of the power plant, autorotation and an emergency parachute recovery system.

The primary structure for this craft 100 is an open-truss composite furnace 108 designed to transfer the loads from rotor and power plant 150 into the landing gear 180A, 180B and canard booms 105. The two vertically inclined trusses 108 may be connected with composite circular beams 153 supporting the rotor/power plant assembly 150 in the horizontal position. The forward inclined frame members 154 may comprise anchor points for hydraulic cylinders (not shown) utilized to raise rotor/power plant 150 assembly into a vertical position. These members 154 also may act as a shock strut for non-routine landings. The rear landing gear assemblies 180A 180B are equipped with combination spring and shock strut levers.

Bottom horizontal truss member 102 forms canard booms 105. at the front and secondary bracing 125A, 125B for tail plane 120 at the rear of craft 100. At right angles to the primary frame trusses 108 are the separate composite tubular wing spars 103 and tubular cross-bracing members 104. The spacing of these spars 103, 104 allow the passage of rotor airflow through the frame of the craft 100. The tubular spars 103 are joined at the ends forming a longitudinal box beam 102 that receives the removable wings 170A, 170B at the outside surface. This box beam 102 may contain conduits and connector plates for the electronic controls for the wing lighting as well as aileron and flap controls. Auxiliary fuel cells may be attached to box beam 102 as well.

The scale of this craft 100 is relatively small relying on open trussed frame 108 to be fitted with an optimized rotor/power plant assembly 150 to achieve the demands of rotor lift to overcome gravity loads. This minimized structural system decreases weight while providing the resistance to deformation due to the various applied forces and loads.

One crucial element of the design is the location of the rotor/power plant assembly 150 near the center of gravity 200 of both the basic and sprint configurations. The weight distribution of this assembly as it rotates from the vertical position toward the horizontal position may be balanced about the pivot point in a manner to keep the center of gravity 200 forward of the center of lift during transition to horizontal flight. In the sprint configuration, the weight of the rotor/power plant assembly 150 may be located near the center of gravity 200 of the total frame 108 without the wings 170A, 170B. Stability may be acquired through the compelling thrust vector relative to other forces as well as the canard and tail plane control surfaces.

In addition to the yaw control provided by the airflow through the twin vertical stabilizers 130A and 130B, a secondary source of yaw control may be achieved with a vertical tail rotor 101. This tail rotor 101, located aft of pilot/passenger compartments 160A and 160B, may be driven by an independent air-cooled engine 109 located between compartments 160A and 160B. Reversible tail rotor 101 thrust augments the yaw stability and provides for maneuvering the craft 100 about a vertical axis.

The craft 100 may be supported on the ground at three locations. The horizontal bottom rails 102 of the trussed frame 108 may be turned down into two parallel booms 105 supporting the canard 100. These booms 105 rest on the ground but may be elevated by a single, hinged and electrically operated front wheel assembly 185 during ground operations. At the rear of the trussed frame 108 two wheel assemblies 180A and 180B with brakes and shock absorbers may support craft 100. The footprint of these support points may be widely spaced allowing for sufficient stability of the craft 100 with rotor/power plant assembly 150 in the vertical position. Box beams 103 at removable/hinged wings 170A, 170B are relatively near the ground to help deter roll over.

The fundamental functions of the craft 100 in sprint mode rely on the tilting rotor/power plant assembly 150 and the reduction of weight by the removal of forward swept wings 170A, 170B. Main rotors 190A and 190B may be contrarotating to reduce the amount of rotor torque reaction. The mechanical components for reversing the hub rotation between the rotor roots are concealed within a cowl. The engine/rotor assembly 150 may comprise a concentric drive shaft and planetary gear device utilized to rotate an outer cylinder connected to the outmost rotor set. The hubs may contain electrically driven servomotors to trim individual rotor blades.

Tilting rotor/power plant assembly 150 may be positioned in an arc around a center of gravity 200 pivot point 151. Two hydraulic pistons (not shown) may lift or retract the assembly 150 through a 94 degree arc. The arc extends beyond vertical to a rearward tilt of 4 degrees to allow for slow rearward hovering.

Removable/folding wings 170A and 170B may be hinged at the two longitudinal box beams 102 at the end of open spars 103. Wings 170A and 170B may be manually operated. and therefore composed of aluminum spars, punched ribs and stringers. The combination ailerons/flaps 175A and 175B may be electrically powered through disconnect plugs within box beams 102.

The configuration of the wing form may comprise a traditional airfoil having a larger angle of attack at the wing root and a smaller angle attack at the wing tips. The plan form of the wing may comprise that of a long chord and shortened length wing yielding the lift area necessary for weight and control of craft 100. The forward swept wing may be used to attain a center of lift more forward than a perpendicular alignment. This may be necessary for the balance of lift and weight distribution during horizontal lift-off and flight.

The control surfaces of the craft 100 are redundant in two areas. While the ailerons/flaps 175A and 175B may be electrically operated, oversized elevators 120A and 120B on horizontal stabilizers 120 and rudders 135A and 135B on vertical stabilizers 130A and 130B may be electrically operated and/or manually operated with cabling as a safety override.

Nose gear 185 may be electrically operated for ground movement and steering. Dual rear landing gears 180A, 180B may be fixed with shock absorbers.

Retracted tail rotor 101 is unlike the customary tail rotor of a helicopter whose primary function is to resist main rotor torque in one direction. The tail rotor 101 of this craft 100 may be capable of providing a thrust vector in both directions to provide yaw control. The trim of the tail rotor 101 may be more akin to reversible fans than airfoils.

A second, smaller, air-cooled engine 109 may drive tail rotor 101. This engine 109 may be located directly in front of the tail rotor 101 and beneath the arc of the main power plant in down position.

The main power plant for the craft 100 may be directly aligned with the concentric drive shafts of the contrarotating rotor assembly. While a number of power plant types can be utilized in the craft 100, two types are clearly more appropriate. In the preferred embodiment, the engine comprises an internal combustion engine manufactured by the Dyna-Cam Aero Engine Corporation. This is a twelve cylinder, six longitudinal-piston engine using a cam plate crankshaft, which produces high torque to turn the larger rotors 190A and 190B at a lower engine RPM level of 1600 through 2000 RPM.

Another type of power plant that may be used in this craft 100 is the turboprop engine with a reduction gearbox. A number of turbine manufacturers offer relative lightweight units with outputs in the 450 horsepower range. Rolls-Royce produces the very compact Model 250-B17F turboprop engine having a weight of 205 lbs. and develops 450 shaft horsepower for takeoff and 380 shp for normal cruise. This engine has been successfully installed in single and twin-engine small private aircraft 100. The utilization of this type engine depends on the application and the acceptable cost.

Other types of engines, such as turbines discussed above may be used, with suitable gearboxes provided to reduce shaft speed. Dual engines may be fitted to provide redundancy in the event of an engine-out condition. However, in the preferred embodiment, the Dyna-Cam engine is used, as its high torque and lower shaft speed reduce the need for complex speed reducing gearboxes and the like.

A lightweight, single cylinder engine 109 may power vertical tail rotor 101. A suitable example of such an air-cooled engine 109 is manufactured by Gobler-Hirthmortoren. This 35-lb. gas engine provides 25 hp @ 5200 rpm.

The contra-rotating rotor array 190A and 190B may comprise three blades per. rotor plane with a separation angle of 120 degrees between blades. Each array 190A and 190B may have a twelve-foot (12') diameter and the two arrays 190A and 190B may be separated approximately 22 inches on the longitudinal axis of the concentric drive shaft. Each blade 190A, 190B of the array may be constructed with an aluminum core and a carbon fiber warped plane body or airfoil. The root of the blade may be anchored to the hub in a manner allowing feathering of the blades.

The design predecessor for the rotors 190A and 190B included in this design falls between the large diameter graphite/fiberglass rotors of the Bell/Boeing V-22 Osprey and the typical helicopter rotational air foil. The Osprey has a vertical take off maximum total loading of 47,000 lbs. with 2,258-sq. ft. of rotor disk area or approximately 20 lbs. per sq. ft. The craft of the present invention may have approximately 220-sq. ft. of rotor disk area, which, comparatively, lifts 4400 lbs. The smaller scale disk area may not be as efficient and an assumed total load of 2,200 lbs. may be more realistic. Early estimates of the craft maximum vertical takeoff weight fall within this disk area lifting capacity.

The contra-rotating rotors 190A and 190B of this craft 100 do not anticipate blade folding. The design provides for electrical feathering of the blades at the hub.

One essential supposition of the design of present invention is formed on the idea that a craft can be configured in a way that allows volumes of draft air from an array of lifting rotors to pass through a partially open and trussed structure. The lift generated by negative pressure above the air foils and the generally unrestricted flow of the down draft through the open body of the craft 100 can result in, first, a "ground effect" at lift off and, then, reduced parasitic drag in flight. Consequently, the craft 100 is designed with open vertical trusses supporting the rotor/power plant assembly 150 and connecting the other separate parts of the of the fuselage and tail plane. The transverse wing forms are connected to the frame 108 of the fuselage with open spars 103.

The materials utilized in these structural elements may comprise composites of light aluminum tubing and fiber-reinforced plastics. The tubular sections of structural frame 108 may be designed to accommodate forces imposed on each member. Where impact forces are expected, the tubular sections may be designed for compressive forces in a way to absorb the loads and transmit portions of the loads to other members without failure. A number of reinforced resin composites are available for fabrication the structural elements of craft 100. The selection of the specific composite material may be determined by the engineered loading on individual structural members.

This convertible craft 100, like the helicopter, is inherently unstable in the sprint configuration when compared to a fixed wing airplane. Thus, redundant safety features may be incorporated into the design. The use of autorotation as a means of controlled power-off descent is one inherent safety feature. A second safety feature is the implementation of an emergency parachute recovery system (e.g., ballistic parachute recovery). The location of a parachute package may be problematic due to the rotation of the rotors from horizontal to a vertical position. The logical location of this compact device may be in the spinner dome of the rotor assembly, a feature not included in the proportions of the spinner as illustrated in the Figures. Emergency procedures for horizontal flight may require the quick release of the rotor assembly from a forward position for a controlled roll up to a vertical position. When the rotor assembly is in the vertical position it may be possible to initiate autorotation and the deployment of the emergency parachute recovery system.

A more radical safety feature is the design of the individual cabins 160A, 160B in a manner that allows the pilot and passenger to be ejected outward from the fuselage. This may require that the seat and the rear portion of the cabin to be separable from the forward portion of the cabin containing the control panel and control linkages. While this is a possibility, it is seen as being complicated and in contrast with the basic goal of designing a relatively low cost craft 100 for very specialized uses. In an alternative embodiment, where all controls are provided as electrical controls, the entire cabins 160A, 160B may be ejected from the craft 100 by providing a quick-disconnect for electrical connections from the instrument panel and controls within each cabin 160A and 160B.

Fuel tanks may be located in the longitudinal box beams 102 at the end of open spars 103 and roots of wings 170A and 170B. The capacity of the built-in tanks may be, for example, 20 gallons for the internal combustion Dyna-Cam engine. In configurations utilizing the turbine power plant, supplemental fuel pods 106 may be attached above both longitudinal box beams 102 to increase the fuel available for specific missions. Alternately, pod 106 may contain the craft battery and various control systems. Since this craft may be used only for short missions, the fuel component of the useful load may be reduced. The Dyna-Cam internal combustion engine may use 100 LL AvGas, 80 octane or Unleaded Auto Gas (regular or supreme). The fuel may be delivered to engine/rotor package 105 by electric pumps located in longitudinal box beams 102. The final section of the fuel lines may be flexible to accommodate the rotation of the rotor/power plant assembly.

While not included in the graphical description of the craft 100 in the Figures, in an alternative embodiment, auxiliary power devices might be attached to craft 100 in order to accelerate the ascent and arc into horizontal flight. Specifically, booster rocket engines could be located above the engine cowling with thrust vectors synchronized with the thrust vector of the rotor assembly.

The APPENDIX submitted in Provisional U.S. Patent Application Ser. No. 60/519,859, filed Nov. 14, 2003, incorporated herein by reference, contains original plan drawings for the present invention.

While the preferred embodiment and various alternative embodiments of the invention have been disclosed and described in detail herein, it may be apparent to those skilled in the art that various changes in form and detail may be made therein without departing from the spirit and scope thereof.

I claim:

1. A short or vertical take-off aircraft, comprising:
   at least one rotor;
   a centrally mounted engine nacelle containing at least one engine, coupled to the at least one rotor, rotatably mounted substantially at aircraft center of gravity, the centrally mounted engine nacelle pivoting in an arc from a first position where the rotating planes of the at least one rotor is substantially horizontal for short take off, vertical take off, and vertical flight to a second position where the rotating planes of the at least one rotor is substantially vertical for horizontal flight,
   wherein the aircraft center of gravity remains substantially the same when the centrally mounted engine nacelle pivots from the first position to the second position.

2. The aircraft of claim 1, wherein the at least one rotor comprises a pair of counter-rotating rotors mounted on a common axis.

3. The aircraft of claim 1, further comprising:
   a fuselage having a pair of cockpit modules, each of the pair of cockpit modules mounted on a respective side of the centrally mounted engine nacelle such that the centrally mounted engine nacelle is located between the cockpit modules, maintaining the center of gravity of the aircraft substantially between the cockpit modules.

4. The aircraft of claim 1, further comprising:
   at least one tail boom, coupled to the fuselage, the tail boom including at least one vertical and one horizontal stabilizer for controlling pitch and direction of the aircraft.

5. The aircraft of claim 1, further comprising:
   at least one nose boom, coupled to the fuselage, the nose boom including at least one substantially horizontal canard wing.

6. The aircraft of claim 1, further comprising:
   detachable wings, attached to either side of the fuselage for providing additional lift for the aircraft.

7. The aircraft of claim 6, wherein the detachable wings further include ailerons for providing yaw control for the aircraft.

8. The aircraft of claim 1, further comprising: foldable wings, attached to either side of the fuselage, for providing additional lift for the aircraft.

9. The aircraft of claim 8, wherein the foldable wings further include ailerons for providing yaw control for the aircraft.

10. The aircraft of claim 1, further comprising: a reversible tail rotor, for controlling yaw about a vertical axis of the aircraft, the tail rotor being mounted adjacent the centrally mounted engine nacelle and pair of cockpit modules, the tail rotor providing reversible thrust to selectively rotate the aircraft about a vertical axis.

11. The aircraft of claim 5, wherein the substantially horizontal canard wing is a fixed canard wing.

12. The aircraft of claim 5, wherein the substantially horizontal canard wing is a movable canard wing.

13. A tilt rotor aircraft, comprising:
    a centrally mounted tiltable engine nacelle and rotor assembly mounted substantially at the center of gravity of the aircraft, the engine nacelle and rotor assembly tiltable without substantially disturbing the center of gravity of the aircraft;
    an aircraft frame, having a pivot mount to pivotally mount the engine nacelle and rotor assembly,
    a pair of cockpit pods, for at least a pilot and co-pilot, the cockpit pods mounted to the aircraft frame on either side of the engine nacelle.

14. The tilt rotor aircraft of claim 13, wherein the centrally mounted tiltable engine nacelle and rotor assembly includes at least one engine and at least one pair of counter-rotating rotors driven by the at least one engine to eliminate torque effects.

15. The tilt rotor aircraft of claim 14, wherein the at least one engine comprises a turbine engine.

16. The tilt rotor aircraft of claim 15, wherein the radius of the rotor assembly is less than the distance from the rotor assembly to the ground such that the rotor clears the ground when in vertical flight mode, allowing the aircraft to land like an ordinary fixed-wing aircraft without damaging the counter-rotating rotors and allowing the tilt rotor aircraft to be launched and landed in one or more of VTOL, HTOL, and STOL configurations.

17. The tilt rotor aircraft of claim 16, further comprising:
    at least one tail boom, coupled to the aircraft frame, the tail boom including at least one vertical and one horizontal stabilizer for controlling pitch and direction of the aircraft.

18. The tilt rotor aircraft of claim 17, further comprising:
    at least one nose boom, coupled to the aircraft frame, the nose boom including at least one substantially horizontal canard wing.

19. The tilt rotor aircraft of claim 18, further comprising:
    detachable wings, attached to either side of the aircraft frame for providing additional lift for the aircraft.

20. The tilt rotor aircraft of claim 19, wherein the detachable wings further include ailerons for providing yaw control for the aircraft.

21. The tilt rotor aircraft of claim 20, further comprising:
    a reversible tail rotor, for controlling yaw about a vertical axis of the aircraft, the tail rotor being mounted adjacent the engine nacelle and pair of cockpit modules, the tail rotor providing reversible thrust to selectively rotate the aircraft about a vertical axis.

22. The tilt rotor aircraft of claim 18, wherein the substantially horizontal canard wing is a fixed canard wing.

23. The tilt rotor aircraft of claim 18, wherein the substantially horizontal canard wing is a movable canard wing.

24. The aircraft of claim 1, wherein in the first position, the at least one rotor is located horizontally at a position above the engine nacelle, and in the second position, the at least one rotor is located vertically at a position in front of the engine nacelle.

* * * * *